United States Patent
Sung et al.

(10) Patent No.: US 8,038,919 B2
(45) Date of Patent: Oct. 18, 2011

(54) METHOD OF MANUFACTURING FILM ANTENNA USING SPUTTERING PROCESS

(75) Inventors: Jae Suk Sung, Gyunggi-Do (KR); Hag Bong Kim, Seoul (KR); Sang Hee Kim, Seoul (KR); Heung Suk Go, Gyunggi-Do (KR); Jeong Kon Kim, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 378 days.

(21) Appl. No.: 11/773,887

(22) Filed: Jul. 5, 2007

(65) Prior Publication Data

US 2008/0095929 A1    Apr. 24, 2008

(30) Foreign Application Priority Data

Jul. 6, 2006  (KR) .................. 10-2006-0063234

(51) Int. Cl.
*B29C 45/14* (2006.01)
*H01Q 1/40* (2006.01)

(52) U.S. Cl. ............... 264/272.11; 264/271.1; 343/873; 204/192.14

(58) Field of Classification Search ............. 204/192.14; 264/271.1, 272.11; 343/873
See application file for complete search history.

(56) References Cited

U.S. PATENT DOCUMENTS

| | | | |
|---|---|---|---|
| 3,668,034 A | 6/1972 | Nicholas et al. | |
| 4,898,789 A * | 2/1990 | Finley | 428/623 |
| 5,080,455 A * | 1/1992 | King et al. | 359/350 |
| 5,221,662 A * | 6/1993 | Etrillard et al. | 505/446 |
| 5,965,629 A * | 10/1999 | Jung et al. | 522/1 |
| 6,162,512 A | 12/2000 | Koh et al. | |
| 6,280,821 B1 * | 8/2001 | Kadunce et al. | 428/157 |
| 6,396,444 B1 * | 5/2002 | Goward et al. | 343/702 |
| 2002/0030443 A1 * | 3/2002 | Konuma et al. | 313/504 |
| 2002/0047804 A1 * | 4/2002 | Ghosh et al. | 343/700 MS |
| 2003/0118860 A1 * | 6/2003 | O'Shaughnessy et al. | 428/629 |
| 2003/0128165 A1 | 7/2003 | LaKomski | |
| 2004/0036655 A1 * | 2/2004 | Sainati et al. | 343/702 |
| 2005/0095449 A1 * | 5/2005 | Yanagisawa et al. | 428/689 |
| 2005/0113035 A1 * | 5/2005 | Kyongyop O | 455/90.3 |
| 2005/0145968 A1 * | 7/2005 | Goela et al. | 257/437 |

(Continued)

FOREIGN PATENT DOCUMENTS

EP    0067902    12/1982

(Continued)

OTHER PUBLICATIONS

German Office Action in Application No. 102007031171.2 issued Mar. 31, 2010.

(Continued)

*Primary Examiner* — Yogendra N Gupta
*Assistant Examiner* — Jeremiah Smith
(74) *Attorney, Agent, or Firm* — Lowe, Hauptman, Ham & Berner, LLP

(57) ABSTRACT

A method of manufacturing a film antenna includes: preparing a carrier film formed of an insulation polymer material; forming an antenna radiator on at least one side of the carrier film by one of sputtering and deposition; inserting the carrier film with the antenna radiator formed thereon into a mold having a shape of a mobile communication terminal case; and forming a mobile communication terminal case integrally formed with the carrier film by injecting a molding material into the mold.

12 Claims, 6 Drawing Sheets

U.S. PATENT DOCUMENTS

| | | | |
|---|---|---|---|
| 2005/0173731 A1* | 8/2005 | Hasegawa | 257/200 |
| 2006/0062948 A1* | 3/2006 | Kalishek | 428/34.9 |
| 2006/0110294 A1* | 5/2006 | Engstrom et al. | 422/100 |
| 2006/0241322 A1 | 10/2006 | Shah | |
| 2009/0128893 A1* | 5/2009 | McCarthy et al. | 359/352 |

FOREIGN PATENT DOCUMENTS

| | | |
|---|---|---|
| EP | 1188534 | 3/2002 |
| GB | 2345196 | 6/2000 |
| GB | 2345196 A | 6/2000 |
| JP | 10101459 | 4/1998 |
| KR | 10-2000-0020275 A | 4/2000 |
| TW | I252150 | 4/2006 |
| WO | 0039883 | 7/2000 |
| WO | WO2004067444 * | 8/2004 |

OTHER PUBLICATIONS

Japanese Office Action for application No. 2007-178255, issued Feb. 9, 2010.

Japanese Office Action for Application No. 2007-178255 mailed Feb. 15, 2011.

Chinese Office Action for application No. 200710126067.X, issued Sep. 14, 2010.

* cited by examiner (a)

(b)

(a)

(b)

(a)

(b)

METHOD OF MANUFACTURING FILM ANTENNA USING SPUTTERING PROCESS

CLAIM OF PRIORITY

This application claims the benefit of Korean Patent Application No. 2006-0063234 filed on Jul. 6, 2006, in the Korean Intellectual Property Office, the disclosure of which is incorporated herein by reference.

BACKGROUND OF THE INVENTION

1. Field of the Invention

The present invention relates to a film antenna, and more particularly, to a film antenna integrally formed with a mobile communication terminal case.

2. Description of the Related Art

Mobile communication terminals including global positioning systems, personal digital assistants, cellular phones, wireless notebook computers and the like are required to be further miniaturized recently as they are widely used more than ever before. In order to meet such a demand, the focus has been placed on reducing the volume of the terminals while retaining diverse functions of the terminals. This applies also to antennas, which is an essential part of the mobile communication terminals.

In general, among different kinds of antennas of the mobile communication terminals, external antennas such as rod antennas and helical antennas extend in a certain length from exteriors of terminals, limiting miniaturization and portability of the terminals. In addition, they are likely to be damaged when the mobile communication terminals are dropped.

On the other hand, internal antennas mounted inside mobile communication terminals, such as surface-mounted chip antennas, have a reduced risk of damage but limit miniaturization of the terminals due to their physical size.

Therefore, there has been introduced a method of forming a radiator of the antenna directly in a terminal case or on an antenna base, effectively utilizing a space.

FIG. 1A is a perspective view illustrating a conventional internal antenna for a mobile communication terminal, and FIG. 1B is a sectional view illustrating the conventional internal antenna mounted in a mobile communication terminal.

Referring to FIG. 1A, a base 11 of plastic material and a radiator 13 in a form of a metal plate with a pattern formed thereon are manufactured by injection molding and pressing, respectively, and integrated afterwards by fusion bonding.

However, in such a method, a basic space is required inside a terminal for mounting the antenna, limiting miniaturization of the terminal.

In this case, the radiator 13 may be formed on the base 11 by printing a conductive ink. However, since the antenna base is formed of a plastic material, the work of forming the radiator 13 on the base 11 should be conducted at a certain temperature or lower, which does not bring about deformation of the plastic material. Therefore, the antenna pattern formed on the base may be printed by using a low-temperature paste, which is limited in selection with factors to be considered, such as printability and adhesion property.

In addition, the conductive ink includes conductive and organic substances for printability and adhesion property. In this case, the organic substances may be eliminated from the conductive ink when the conductive ink is treated at high temperatures but may remain in the conductive ink when the conductive ink is treated at low temperatures. With the antenna base formed of a polymer-based material, it is not suitable to treat the conductive ink at high temperatures, and thus, the organic substances tend to remain in the conductive ink even after the radiator of the antenna is completed. This may lead to degradation of electric conductivity, which is the most important property of the radiator of the antenna, eventually causing deterioration of radiation characteristics of the antenna.

Furthermore, printing the conductive ink on a three-dimensional antenna base is a difficult operation.

SUMMARY OF THE INVENTION

An aspect of the present invention provides a method of manufacturing an antenna, in which organic substances causing deterioration of electric conductivity of an antenna radiator is excluded, thereby providing an antenna with excellent radiation characteristics.

According to an aspect of the invention, there is provided a method of manufacturing a film antenna including: preparing a carrier film formed of an insulation polymer material; forming an antenna radiator on at least one side of the carrier film by one of sputtering and deposition; inserting the carrier film with the antenna radiator formed thereon into a mold having a shape of a mobile communication terminal case; and forming a mobile communication terminal case integrally formed with the carrier film by injecting a molding material into the mold.

The forming an antenna radiator may include: attaching a masking tape, with a desired radiator pattern cut out, onto the at least one side of the carrier film; sputtering a metal, for forming the radiator, on the side of the carrier film with the masking tape attached thereon; and removing the masking tape from the carrier film.

The attaching a making tape may include attaching the masking tape on each of both sides of the carrier film.

The sputtering may include simultaneously sputtering the both sides of the carrier film.

The method may further include surface-modifying an exposed portion of the carrier film between the attaching a masking tape and the sputtering.

The surface-modifying may include forming a hydrophilic functional group on a surface of the carrier film by simultaneously emitting an ion beam to the surface of the carrier film and injecting reactive gas around the carrier film inside a vacuum chamber.

The sputtering may include using a metal with a purity of 99.9% as a sputter target.

The metal may be one of Ag, Ni and Cu.

According to another aspect of the invention, there is provided a method of manufacturing a film antenna including: preparing a plurality of carrier films; forming an antenna radiator on one side of each of the plurality of carrier films by sputtering; depositing the plurality of carrier films each with the antenna radiator formed thereon; inserting the deposited carrier films into a mold having a shape of a mobile communication terminal case; and forming a mobile communication terminal case integrally formed with the deposited carrier films by injecting a molding material to the mold.

The plurality of carrier films may be formed of different materials, respectively.

The antenna radiators formed on the plurality of carrier films may be formed of different electrode materials, respectively.

The depositing a plurality of carrier films may include forming a ceramic coating on a top of the deposited carrier films.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

FIGS. 2A through 2E illustrate a method of manufacturing a film antenna according to an exemplary embodiment of the present invention.

Figure 1:
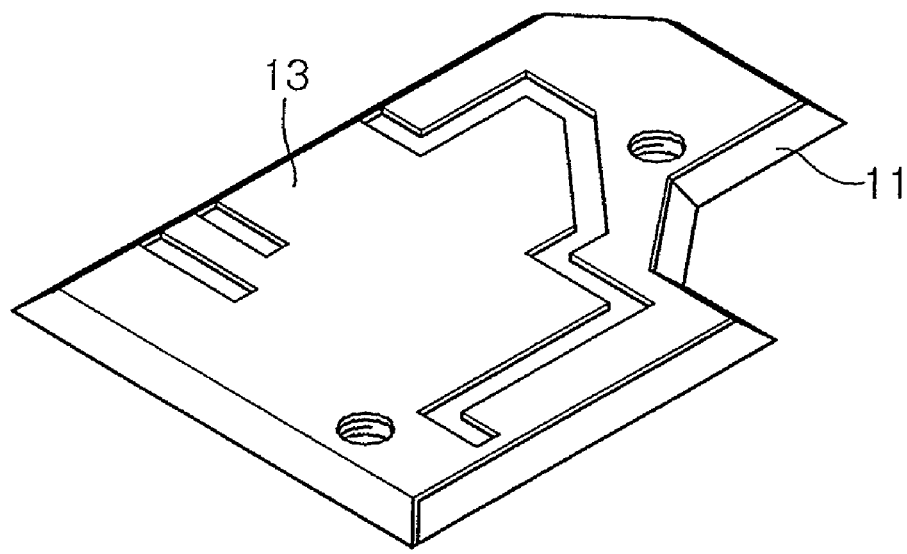
FIGS. 1A and 1B are a perspective view illustrating a conventional internal antenna and a schematic cross-sectional view illustrating the conventional internal antenna mounted in a terminal, respectively.
Figure 1:
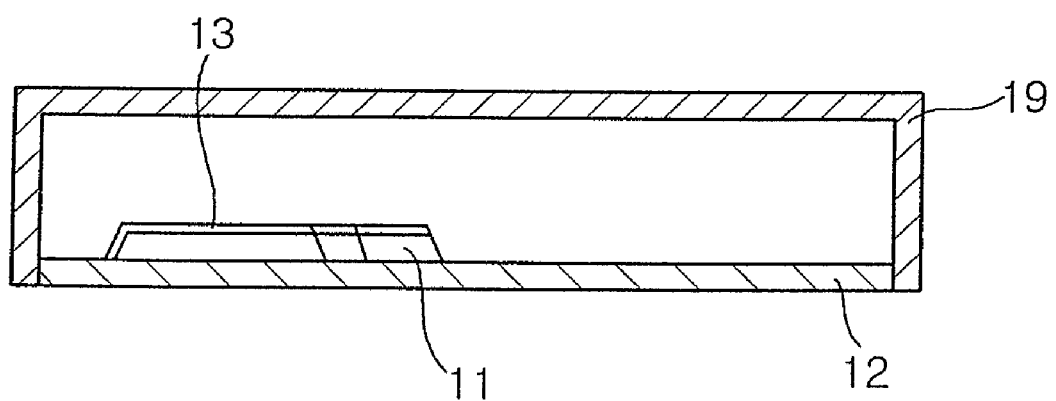
Figure 2:
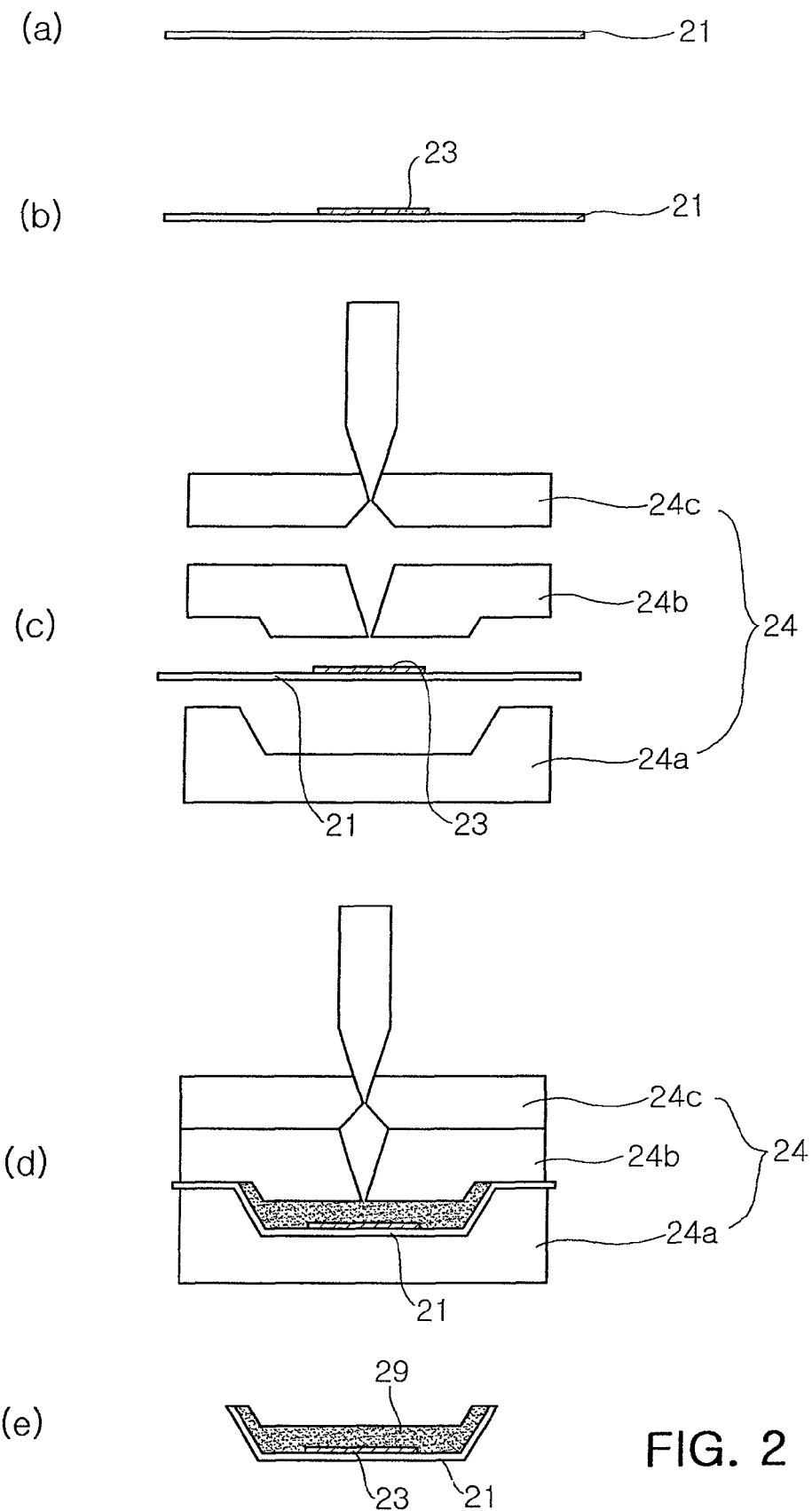
FIGS. 2A through 2E are diagrams illustrating a method of manufacturing a film antenna according to an exemplary embodiment of the present invention, respectively.

FIG. 2A illustrates an operation of preparing a carrier film.

An antenna radiator is formed on at least one side of a carrier film 21, and the carrier film 21 with the antenna radiator formed thereon is inserted into a mold for an in-mold labeling (IML) process. Therefore, it is required to form the carrier film 21 by using a material, which can be easily integrated with a mobile communication terminal case while it is not easily deformed by pressure and temperature during the molding process.

Thus, the carrier film may be formed of a thin insulating polymer material.

Figure 3:
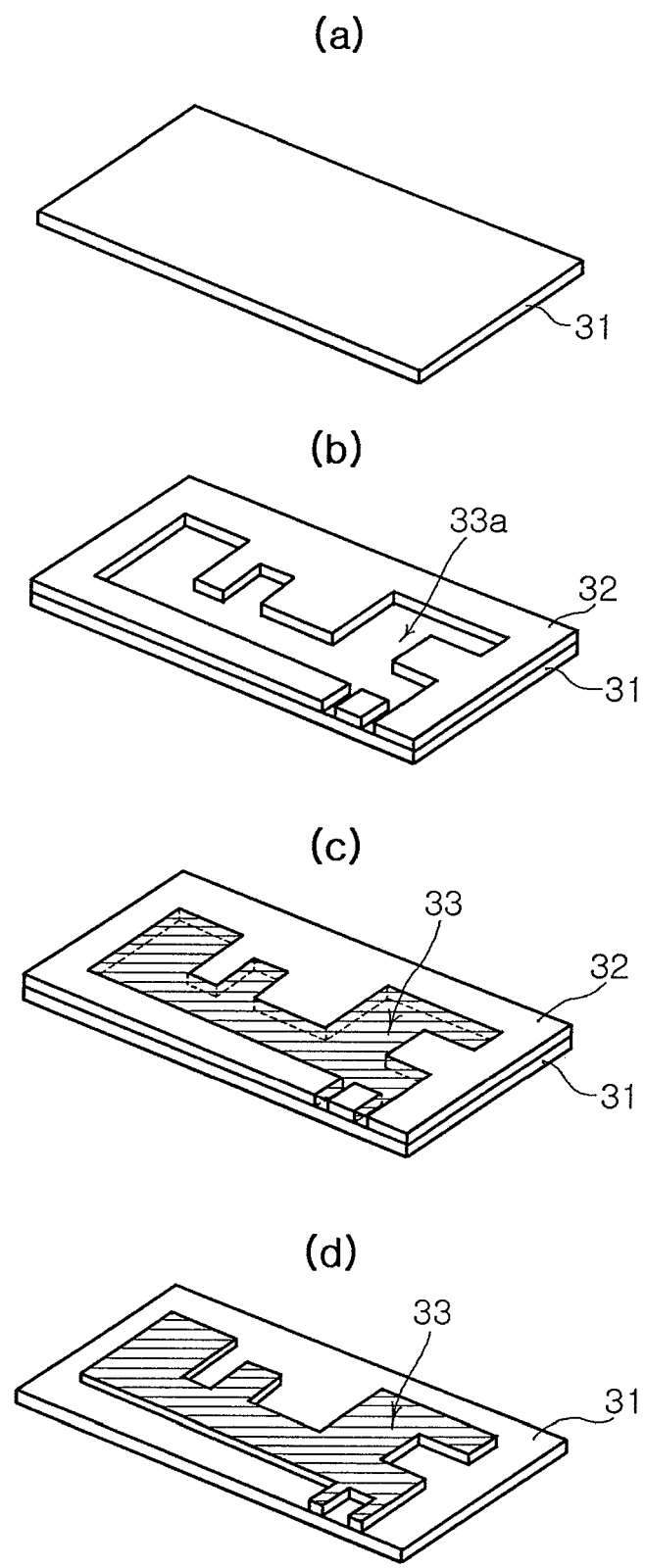
FIGS. 3A through 3D are diagrams illustrating a process of forming an antenna radiator on a carrier film, according to an exemplary embodiment of the present invention, respectively.

FIG. 2B illustrates an operation of forming the radiator on the carrier film by a sputtering process. The sputtering process will be explained in detail with reference to FIG. 3.

FIG. 2C shows a location of the carrier film 21, with the radiator 23 formed thereon, in a mold 24. The mold 24 includes a first part 24a forming a lower part of the mold, in contact with the carrier film 21; a second part 24b forming an upper part of the mold, through which a molding material is injected into the mold; and a third part 24c connected to a storage of the molding material via a nozzle. The carrier film 21 is inserted between the first part 24a and the second part 24b in such a way that the radiator 23 formed on the carrier film comes in direct contact with the molding material injected during the molding process.

FIG. 2D illustrates an operation of assembling all parts of the mold. At this time, the molding material is injected at a regulated pressure into an inner space of the mold 24 via the nozzle. The carrier film 21 takes a shape of the first part 24a of the mold by the injection pressure of the molding material, and the molding material injected into the mold fills the inner space between the second part 24b and the first part 24a.

FIG. 2E illustrates a film antenna formed by integrating the carrier film 21, having the radiator 23 formed thereon, with a mobile communication terminal case 29, by cooling and curing the molding material after compressed in the mold 24.

FIGS. 3A through 3D are diagrams illustrating a process of forming a radiator pattern on the carrier film in the process of manufacturing the film antenna according to an exemplary embodiment of the present invention.

Referring to FIGS. 3A through 3D, a carrier film is prepared in FIG. 3A, a masking tape is attached on the carrier film in FIG. 3B, sputtering is performed on the carrier film in FIG. 3C and the masking tape is removed in FIG. 3D.

FIG. 3A illustrates an operation of preparing a carrier film. The carrier film may be formed of a thin insulating polymer material.

FIG. 3B illustrates an operation of attaching a masking tape 32 on the carrier film 31.

The masking tape has a pattern 33a in a desired shape of radiator cut out so that the radiator pattern is formed in to the shape of the cut-out pattern 33a, via a sputtering process.

FIG. 3C illustrates an operation of sputtering a conductive material onto the carrier film to form the radiator pattern.

In the sputtering process, ion beams are injected to a target material to allow atoms of the target material to be ejected from the target material and deposited onto a surface of the carrier film 31, thereby forming the radiator pattern 33 of the antenna.

In the sputtering process, the sputter target material is formed of a conductive material with a purity of 99.9% or higher, and therefore, the radiator formed on the carrier film by sputtering also has the same degree of purity as the sputter target, possessing high electric conductivity.

This can solve the problem of decreased electric conductivity by the organic substances contained in the paste when a conductive ink such as a silver paste is used.

In addition, since the sputtered radiator material does not contain any organic substances, the radiator may be chemically stable. In particular, the existing screen printing method requires using a paste containing solvent, which is harmful to human body, whereas the present method can significantly reduce the harmful effect to human body.

FIG. 3D illustrates an operation of forming the radiator pattern 33 on the carrier film by removing the masking tape 32.

Figure 4:
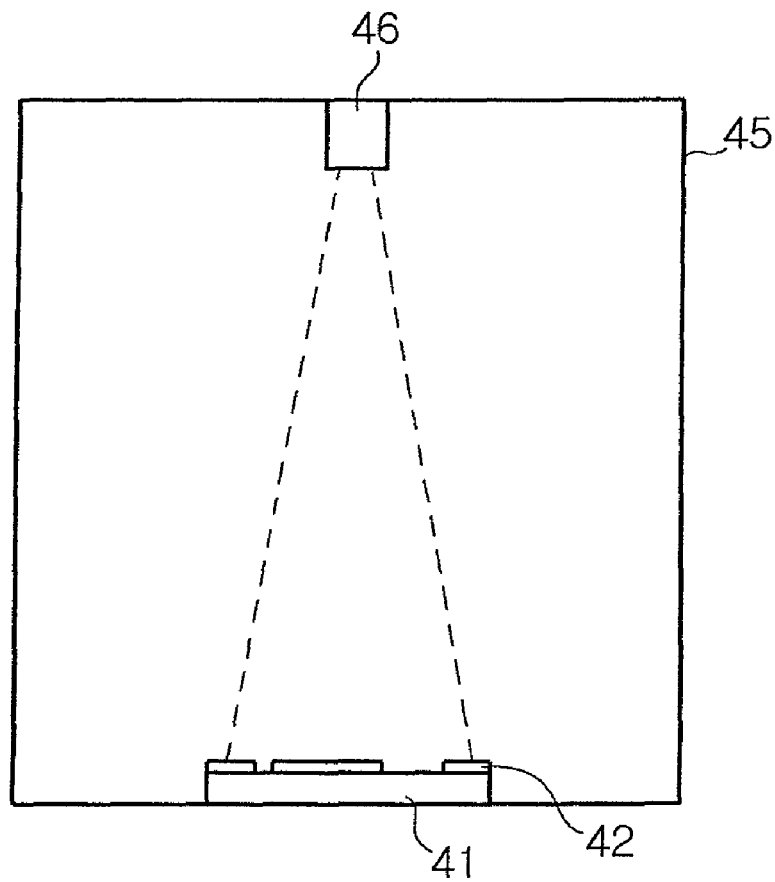
FIGS. 4A and 4B are cross-sectional views illustrating an apparatus for treating a surface by using ion beams and a carrier film with a modified surface, according to an exemplary embodiment of the present invention, respectively.
Figure 4:
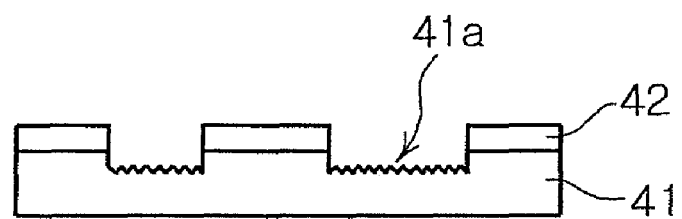

FIGS. 4A and 4B are a vertical cross-sectional view illustrating an apparatus treating a surface by using ion beams for modifying a surface of the carrier film 31 before sputtering and a cross-sectional view illustrating the carrier film with a modified surface, respectively.

As shown in FIG. 4A, the carrier film 41 with the masking tape 42 attached thereon is placed below an ion gun 46 inside a vacuum chamber 45, in which a vacuum state maintained by a vacuum pump (not shown), and ion beams are generated and emitted from the ion gun 46 to the carrier film 41.

In this case, the vacuum chamber may maintain a vacuum state at about $1\times10^{-1}$ torr to $1\times10^{-6}$ torr, and the ion beams may be injected at an ion injection energy of about 10 to 10000 eV. In addition, an amount of the ion beams injected to the carrier film 41 may be from about $1\times10^{12}$ to $1\times10^{20}$ ion/cm$^2$.

At the same time, reactive gas is injected through a gas pipe (not shown) installed outside the vacuum chamber 45 to generate ions, and the reactive gas may be one of oxygen, air, ammonia, hydrogen, carbon monoxide, carbon dioxide, nitrogen, nitrous oxide and hydrocarbon. In addition, instead of the reactive gas, non-flammable gas such as helium, argon, nitrogen, neon, xenon and krypton may be injected. In this case, the injection amount of the reactive gas may be from about 1 to 500 sccm.

In the ion-assisted reaction as described above, ion beams having a low energy from 0.1 keV to 10 keV are emitted to a surface of the carrier film 41 while reactive gas is injected around the carrier film, thereby forming a new hydrophilic functional group 41a on a surface of the carrier film 41. When an electrode material is deposited on the carrier film 41a by the hydrophilic functional group 41a generated as such, the carrier film bonds chemically and physically with the electrode material deposited thereon, thereby exhibiting excellent bonding strength even with a precious metal such as Pt and Au.

Figure 5:
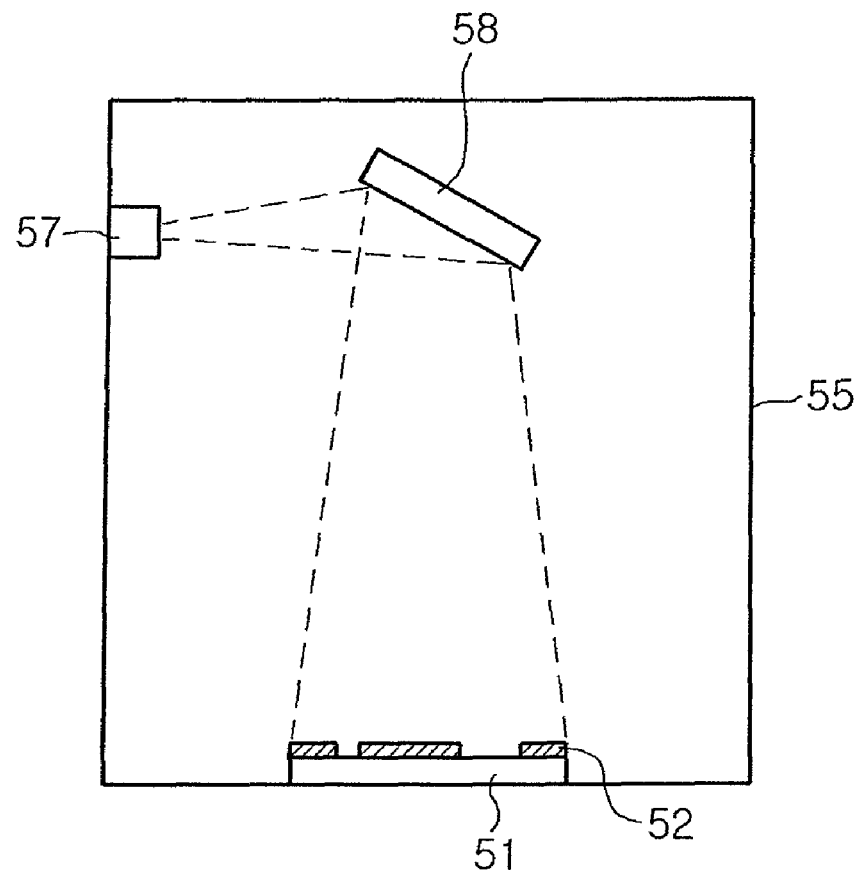
FIGS. 5A and 5B are cross-sectional views illustrating a vacuum chamber for sputtering and the carrier film with a radiator pattern formed thereon, according to an exemplary embodiment of the present invention.
Figure 5:
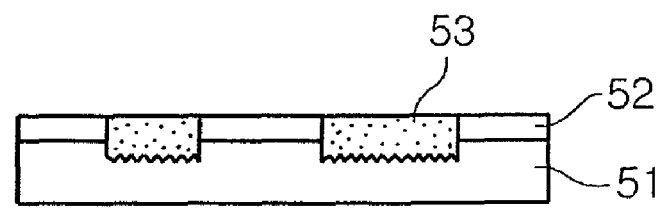

FIGS. 5A and 5B are a sectional view illustrating the vacuum chamber in which the sputtering is implemented to form the radiator pattern on the carrier film and a sectional view illustrating the carrier film with the radiator pattern formed thereon, respectively.

Referring to FIG. 5A, the vacuum chamber 55, where the sputtering is implemented, contains an ion source 57 for deposition including an ionizing part ionizing non-flammable or reactive gas to be supplied to the ion source and an accelerator accelerating the ionized gas ions and emitting the ions; and a sputter target 58 providing a sputtering material.

The ion source 57 employs an electron cyclotron resonance (ECR) using discharge of microwave of 2.45 GHz and is capable of injecting ion beams having a light width of a total length of 600 mm by using three 200 mm-modules. The ion beams have a maximum acceleration energy of 2 keV, a current density of at least 2 mA/cm$^2$ and a uniform region of at least 40 mm within ±5%.

As shown, the ion beams having energy are emitted to the sputter target 58 from the ion source 57 for deposition and the atoms of the sputter target 58 obtain energy from collision with the ion beams emitted from the sputter target 58 and become sputter particles.

The sputter target 58 is a conductive material for constructing the antenna radiator. The conductive material may be copper.

In the sputtering process, since the sputter target 58 is formed of a conductive material of high purity, the radiator formed on the carrier film by sputtering has the same degree of purity as the sputter target, possessing very high electric conductivity.

This can solve the problem of decreased electric conductivity caused by the organic substances contained in the paste when using a conductive ink such as a silver paste.

The sputter particles are emitted and reach the surface of the carrier film, forming a thin film (a seed layer) of about 2000□. The thin film formed as described has improved adhesion strength, density, uniformity and crystallinity. Such a method is called an ion beam sputtering method. The ion beam sputtering method, which is suitable for a low-temperature process, allows formation of a film at room temperature and, therefore is effective for forming a film with high polymer material subject to thermal damage.

The method of forming such a thin film is not limited to the ion beam sputtering and may employ one of low-power and heat vacuum deposition, electron beam vacuum deposition, radio frequency beam vacuum deposition, radio frequency sputtering and direct current sputtering, in which a vapor-deposition process may be performed at a temperature that does not bring about thermal damage to the carrier film.

When a sufficient thickness of the radiator pattern is not obtained by forming the thin film, the seed layer, only, a thick film may additionally be formed on the seed layer.

In this case, the thick film may be formed by one of electrolyte plating, non-electrolyte plating and physical vapor deposition.

Figure 6:
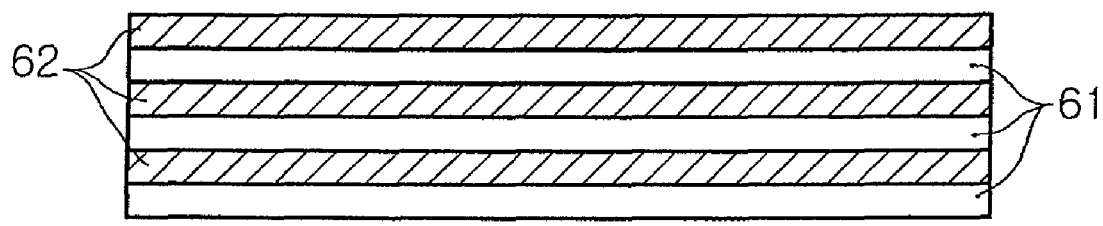
FIGS. 6A through 6C are cross-sectional views illustrating antennas formed of deposited films according to exemplary embodiments of the present invention, respectively.
Figure 6:
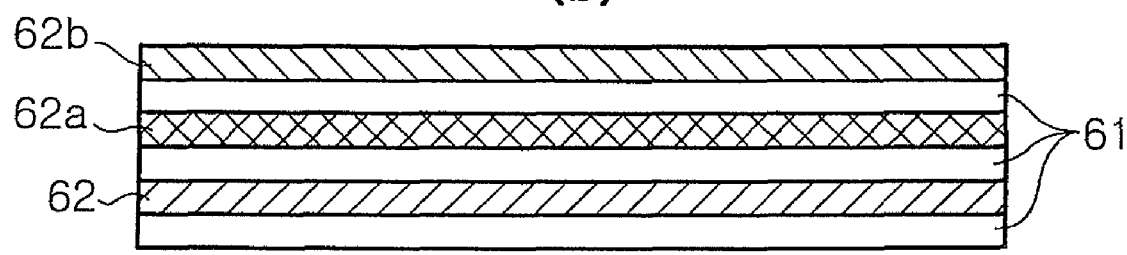
Figure 6:
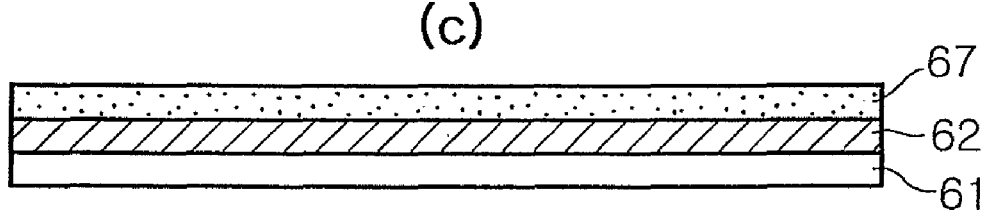

FIGS. 6A through 6C are cross-sectional views illustrating the film antennas formed by depositing a plurality of carrier films with a plurality of antenna patterns formed thereon, respectively. As described above, to form such a film antenna with a multi-layer structure, sputtering is implemented to form a radiator pattern on a surface of each of the carrier films, and the plurality of carrier films with the antenna patterns formed thereon, respectively, are deposited and compressed. FIGS. 6A through 6C are cross-sectional views illustrating the film antennas before being integrated with mobile communication terminal cases via in-molding process.

In FIG. 6A, a plurality of identical carrier films 61 and a plurality of identical radiators 62 are deposited to form a multi-layer structure.

In the case of using a cold paste containing organic substances and solvent, defects may be caused by gas generated when a plurality of layers are formed by deposition. On the other hand, when sputtering is employed, the radiator is formed of pure metal particles, thus preventing the aforementioned problem and easily forming a multi-layer radiator. This consequently improves the antenna capabilities.

In FIG. 6B, different kinds of radiator materials 62, 62a and 62b are formed on a plurality of the identical carrier films 61, respectively, forming a multi-layer structure. In this case, the electric conductivity of the radiator may be sequentially changed to realize one of multi-band and wide-band characteristics of the antenna. This can be realized by using different sputter targets during the sputtering process.

In FIG. 6C, the radiator 62 is formed on each of the carrier films 61 deposited, and a ceramic coating 67 is formed on a top of the deposited radiators. In this case, not only the radiator is formed by sputtering but also the ceramic material is formed by sputtering on the radiator material, thereby enabling adjustment of dielectric properties of the antenna base material. This ultimately leads to high efficiency and miniaturization of the antenna.

As described above, the method of manufacturing a film antenna according to the present invention employs a sputtering process to form a radiator pattern on a carrier film with no impurities, thereby providing an antenna with excellent electric conductivity.

While the present invention has been shown and described in connection with the exemplary embodiments, it will be apparent to those skilled in the art that modifications and variations may be made without departing from the spirit and scope of the invention as defined by the appended claims.

What is claimed is:

1. A method of manufacturing a film antenna for a mobile communications terminal case, said method comprising: preparing a carrier film formed of an insulation polymer material; attaching a masking tape, with a desired radiator pattern cut out, onto the at least one side of the carrier film to expose a portion of the carrier film on said at least one side; placing the carrier film with the masking tape attached thereon inside a vacuum chamber; forming a hydrophilic functional group on the exposed portion of the carrier film by simultaneously (i) emitting an ion beam directly to the exposed portion of the carrier film placed in the vacuum chamber and (ii) injecting gas around the carrier film inside said vacuum chamber; sputtering a metal, for forming an antenna radiator made of said metal on the exposed portion of the carrier film with the hydrophilic functional group formed thereon; removing the masking tape from the carrier film with the antenna radiator formed thereon: inserting the carrier film with the antenna radiator formed thereon into a mold having a shape of a mobile communication terminal case; and molding a mobile communication terminal case integrally with the carrier film and the antenna radiator formed thereon by injecting a molding material into the mold; wherein organic substances causing deterioration of electric conductivity of the antenna radiator are excluded from the antenna radiator; wherein the attaching comprises attaching the masking tape on each of both sides of the carrier film and the sputtering comprises simultaneously sputtering both sides of the film.

2. The method of claim 1, wherein the sputtering a metal comprises using a sputter target of at least 99.9% purity of said metal.

3. The method of claim 2, wherein the metal is one selected from the group consisting of Ag, Ni and Cu.

4. A method of manufacturing a film antenna for a mobile communications terminal case, said method comprising: preparing a plurality of carrier films; surface-modifying at least one side of each of the carrier films and then forming an antenna radiator on said at least one side of said carrier film by sputtering, wherein organic substances causing deterioration of electric conductivity of the antenna radiator are excluded from the antenna radiator, and wherein said sputtering comprises one selected from the group consisting of ion beam sputtering, radio frequency sputtering, and direct current sputtering; stacking the plurality of carrier films each with the antenna radiator formed thereon to obtain a stacked structure; inserting the stacked structure into a mold having a shape of a mobile communication terminal case; and molding a mobile communication terminal case integrally with the stacked structure by injecting a molding material into the mold; wherein the antenna radiators formed on the plurality of carrier films are formed of different electrode materials, respectively, and electric conductivities of the electrode materials are sequentially changed; and wherein the surface-modifying comprises forming a hydrophilic functional group on the exposed portion of the carrier film by simultaneously (i) emitting an ion beam directly to the exposed portion of the carrier film placed in the vacuum chamber and (ii) injecting gas around the carrier film inside said vacuum chamber.

5. The method of claim 4, wherein the plurality of carrier films are formed of different materials, respectively.

6. The method of claim 4, further comprising forming a ceramic coating on a top of the stacked structure.

7. The method of claim 1, wherein sputter particles are deposited on the exposed portion of the carrier film and form a seed layer;
said method further comprising:
depositing a conductive layer thicker than the seed layer and on said seed layer to obtain said antenna radiator.

8. The method of claim 7, wherein said depositing comprises one selected from the group consisting of electrolyte plating, non-electrolyte plating and physical vapor deposition.

9. The method of claim 6, wherein said ceramic coating is formed by sputtering.

10. The method of claim 6, further comprising, for at least one of said carrier films and subsequent to said sputtering which forms a seed layer on the at least one carrier film,
depositing a conductive layer thicker than the seed layer and on said seed layer to obtain the respective antenna radiator on said at least one carrier film;
wherein said depositing comprises one selected from the group consisting of electrolyte plating, non-electrolyte plating and physical vapor deposition.

11. The method of claim 1, further comprising:
forming a ceramic coat on top of the antenna radiator by sputtering.

12. The method of claim 1, wherein said gas comprises at least one selected from the group consisting of carbon dioxide, nitrous oxide and hydrocarbon.

* * * * *